COMBINATION BIAS OSCILLATOR, MIXER AND RECORDING AMPLIFIER
Filed Feb. 25, 1960
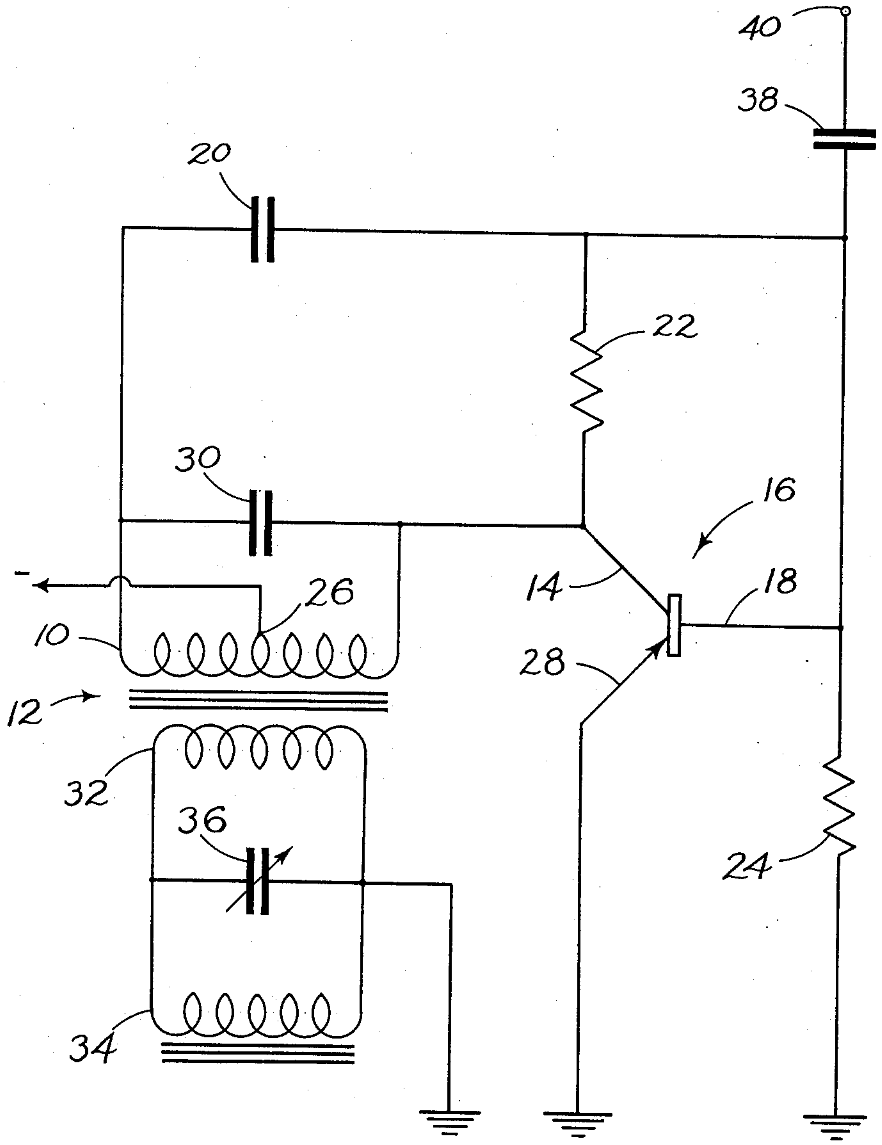
Kenneth A. Catto
INVENTOR.
BY Oliver D. Olson
Agent 3,133,160
Patented May 12, 1964

3,133,160

COMBINATION BIAS OSCILLATOR, MIXER AND RECORDING AMPLIFIER

Kenneth A. Catto, Beaverton, Oreg., assignor to Code-A-Phone Electronics, Inc., Seattle, Wash., a corporation of Washington Filed Feb. 25, 1960, Ser. No. 11,061
3 Claims. (Cl. 179—100.2)

This invention relates to magnetic recording apparatus, and has for its primary objective the provision of a simplified and efficient circuit which functions as a combination bias oscillator, mixer and recording amplifier.

Other objects and advantages of the present invention will appear from the following detailed description, taken in connection with the accompanying drawing in which the single view is a schematic electrical diagram of the combination bias oscillator, mixer and recording amplifier embodying the features of this invention.

The bias oscillator includes the primary winding 10 of the matching transformer 12. One end of the primary winding is connected to the collector 14 of the transistor 16, and the opposite end of the winding is connected to the transistor base 18 through the condenser 20 which prevents shorting of the base-emitter junction by the winding. The value of resistor 22, connected between the collector and base, is chosen to limit the collector current to a safe value. This resistor and the resistor 24 which connects the base to ground or other common positive potential, function to limit the base-emitter bias current to proper value.

The center tap 26 on the primary winding is connected to a negative potential, and the transistor emitter 28 is connected to the ground or other potential which is positive with respect to said negative potential.

A condenser 30 is connected across the primary winding 10, and its value of capacitance is chosen to provide the desired oscillating frequency, as is well known.

The secondary winding 32 of the matching transformer 12 is connected at its opposite ends to the opposite ends of the recording head coil 34, and the number of turns of the secondary winding, relative to the number turns of the primary winding, is chosen to match the secondary winding to the coil of the recording head.

Connected across the secondary winding is a variable condenser 36, one end of which is connected to ground. The capacitance of this condenser is chosen to be sufficiently small, so as to function as a variable shunt for the frequency of the bias oscillator. Hence, by varying the reactance of this condenser, the bias voltage output from the oscillator to the recording head coil may be adjusted.

Also connected to the transistor base 18, through the input condenser 38, is an audio signal input terminal 40 which may be connected to a microphone, radio or other source of audio signal. The audio signal fed to the transistor base is there mixed with the bias oscillator frequency and amplified. The bias oscillator frequency, modulated with the audio signal, is then fed to the recording head coil 34. Since the small capacitance of the variable condenser 36 does not affect the audio signal, the latter is transmitted to the recording head coil without modification.

Although the values of the circuit components may be varied over a considerable range, depending upon the characteristics desired, the following is illustrative of an efficient system for use with a conventional recording head having an impedance of approximately 15,000 ohms: the primary winding 10 of the matching transformer is about 200 ohms and the turns ratio of the transformer is such as to provide the secondary winding 32 with an impedance of approximately 15,000 ohms. The tank condenser 30 is about 0.01 microfarad, the blocking condenser 20 also is about 0.01 microfarad, and the input condenser 38 is about 1 microfarad. Resistor 22 is about 10,000 ohms and resistor 24 is about 220 ohms. The bias voltage shunt condenser 36 is about 500 micromicrofarads. This arrangement provides a bias oscillator frequency of about 30 kilocycles.

From the foregoing it is apparent that the present invention involves an extremely simplified circuit arrangement by which to provide the multiple functions of a bias oscillator, mixer and recording amplifier. The simplicity of the system affords economical manufacture and long and faithful operation with a minimum of maintenance and repair.

It will be apparent to those skilled in the art that various changes may be made in the values and arrangement of components described hereinbefore without departing from the spirit of this invention and the scope of the appended claims.

I claim:

1. In combination, a transformer having a primary coil connected at one end to the collector of a transistor and at the opposite end to the transistor base through a blocking capacitance, a capacitance shunting the primary coil, means connecting the primary coil intermediate its ends to a source of potential, resistance means interconnecting the transistor base and collector, resistance means connecting the transistor base to a source of potential, means connecting the transistor emitter to a source of potential, the source of potential connected to the primary coil being different in magnitude than the potential applied to the transistor base and emitter, and means connecting the transistor base to a source of audio signal, the transformer having a secondary coil adapted to be connected to a recording head coil.

2. The combination of claim 1 wherein the source of potential connected to the primary coil is negative with respect to the potential applied to the transistor base and emitter.

3. The combination of claim 1 wherein the transformer primary coil has a low impedance and the secondary coil has a high impedance for matching a high impedance recording head coil.

References Cited in the file of this patent

UNITED STATES PATENTS

| | | |
|---|---|---|
| 2,654,003 | Dashiell | Sept. 29, 1953 |
| 2,810,791 | West et al. | Oct. 22, 1957 |
| 2,870,270 | Nagai et al. | Jan. 20, 1959 |
| 2,946,858 | Kidd | July 26, 1960 |
| 2,957,050 | Barton | Oct. 18, 1960 |
| 3,009,758 | Marsh | Nov. 21, 1961 |
| 3,026,380 | Reher et al. | Mar. 20, 1962 |